US006755374B1

(12) United States Patent
Carson

(10) Patent No.: US 6,755,374 B1
(45) Date of Patent: Jun. 29, 2004

(54) ANTI-TORQUE AND YAW-CONTROL SYSTEM FOR A ROTARY-WING AIRCRAFT

(76) Inventor: Franklin D. Carson, 933 Street Rd., New Hope, PA (US) 18938

( * ) Notice: Subject to any disclaimer, the term of this patent is extended or adjusted under 35 U.S.C. 154(b) by 0 days.

(21) Appl. No.: 10/353,162

(22) Filed: Jan. 27, 2003

(51) Int. Cl.[7] .............................................. B64C 27/82
(52) U.S. Cl. ................... 244/17.19; 244/17.11
(58) Field of Search .......................... 244/17.11, 17.19, 244/17.21, 765, 91

(56) References Cited

U.S. PATENT DOCUMENTS

| | | | |
|---|---|---|---|
| 3,059,877 A | 10/1962 | Lee .......................... | 244/17.19 |
| 3,807,662 A | 4/1974 | Velazquez ................. | 244/17.19 |
| 4,200,252 A | 4/1980 | Logan et al. ............. | 244/17.19 |
| 4,462,559 A | 7/1984 | Garza ....................... | 244/17.19 |
| 4,660,785 A | 4/1987 | Munski .................... | 244/17.19 |
| 4,708,305 A | 11/1987 | Kelley et al. ............ | 244/17.19 |
| 4,928,907 A | 5/1990 | Zuck ............................. | 244/6 |
| 4,948,068 A | * 8/1990 | VanHorn ................. | 244/17.19 |
| 5,067,668 A | 11/1991 | Zuck ............................. | 244/7 |
| 5,131,604 A | 7/1992 | Yoerkie, Jr. et al. ..... | 244/17.19 |
| 5,209,430 A | 5/1993 | Wilson et al. ............ | 244/17.11 |
| 5,232,183 A | 8/1993 | Rumberger .............. | 244/17.19 |
| 5,240,205 A | 8/1993 | Allongue .................. | 244/17.19 |
| 5,251,847 A | 10/1993 | Guimbal .................. | 244/17.19 |
| 5,388,785 A | 2/1995 | Rollet et al. .............. | 244/17.19 |
| 5,566,907 A | 10/1996 | Marze et al. ............. | 244/17.19 |
| 5,649,678 A | 7/1997 | Nurick ..................... | 244/17.19 |
| 5,676,335 A | * 10/1997 | Murgia et al. ............ | 244/17.19 |
| 5,738,301 A | 4/1998 | Francois et al. ......... | 244/17.19 |
| 6,021,976 A | * 2/2000 | Exter ....................... | 244/17.19 |
| 6,036,141 A | 3/2000 | Clay ........................ | 244/17.19 |
| 6,142,413 A | 11/2000 | Dequin et al. ........... | 244/17.13 |
| 6,416,015 B1 | * 7/2002 | Carson ..................... | 244/17.19 |

OTHER PUBLICATIONS

J. Gordon Leishman, Principles of Helicopter Aerodynamics, 200, Cambridge, p63.*
J. Gordon Leishman, *Principles of Helicopter Aerodynamics*, "Conceptual Design of Helicopters", 2000, 6 228–231.
MD Explorer, Technical Description, "System Description", 2001, 22.
McCormick, B.W., Aerodynamics Aeronautics and Flight Mechanics, 1995, ch 8, 87,30,443,447.
Smith, H., The Illustrated Guide to Aerodynamics, 1989, 1,38–40, 50–51.
Hunt, W.E., "Heelicopter Pioneering With Igor Sikorsky", 1998, 48–51.
Bregger, R.E. et al., "Side by side hover performance comparsons of MDHC 500 notar and tail rotor anti–torque systems", 1992, 689–695, 11–1,11–31.

* cited by examiner

Primary Examiner—Michael J. Carone
Assistant Examiner—Gabriel S. Sukman
(74) Attorney, Agent, or Firm—Woodcock Washburn LLP

(57) ABSTRACT

A preferred embodiment of a rotary-wing aircraft comprises a main rotor, a tail boom extending through an area of downwash from the main rotor, and a linear nozzle fixedly coupled to the tail boom and having an opening extending along the tail boom for discharging a sheet of fluid in a direction substantially tangential to an outer surface of the tail boom. A preferred embodiment also comprises a yaw-control device movably coupled to the tail boom and having an opening formed therein for discharging fluid in a direction away from the yaw-control device and into the area of downwash from the main rotor.

37 Claims, 10 Drawing Sheets

ANTI-TORQUE AND YAW-CONTROL SYSTEM FOR A ROTARY-WING AIRCRAFT

FIELD OF THE INVENTION

The present invention relates to rotary-wing aircraft such as helicopters. More specifically, the invention is directed to a system and a method for providing anti-torque and yaw control in a rotary-wing aircraft without the use of a conventional tail rotor.

BACKGROUND OF THE INVENTION

Tail rotors are the most prevalent means for providing yaw control, and for overcoming the biasing torque generated by the main rotor in rotary-wing aircraft such as helicopters. Tail rotors, however, possess a number of substantial disadvantages. For example, tail rotors present a serious safety risk to ground personnel working in the vicinity of rotary-wing aircraft. In addition, inadvertent contact between tail rotors and stationary objects on the ground causes a substantial number of accidents each year. Tail rotors also necessitate the use of multiple bearings, right-angle gearboxes, and high-speed shafting, and thus raise reliability and maintainable issues.

Furthermore, small arms fire and projectiles from other types of weapons can incapacitate a tail rotor, leading to a sudden and total loss of anti-torque and yaw control and rendering the aircraft uncontrollable. This vulnerability is of particular concern in military aircraft. In addition, the tail rotor makes a substantial contribution to the overall acoustic signature of a rotary-wing aircraft, adds significantly to pilot workload, and can make a rotary-wing aircraft difficult to control in cross-wind conditions.

Tail rotors also possess substantial disadvantages from the standpoint of energy consumption. In particular, the power needed to operate a tail rotor usually represents a significant portion, e.g., fifteen percent, of a rotary-wing aircraft's overall shaft-horsepower requirement. Thus, the use of a tail rotor necessitates a larger power plant than would otherwise be required, and increases the overall fuel consumption of the aircraft.

Systems that eliminate the need for a tail rotor have been developed. For example, U.S. Pat. Nos. 3,059,877; 4,200,252; and 4,948,068, each of which is incorporated by reference herein in its entirety, describe anti-torque and yaw-control systems based on the principle of circulation control (also referred to as circulation-control blowing). Circulation control is an aerodynamic phenomenon in which a bulk flow around a body is deflected by a sheet of air ejected tangentially to the surface of the body. The deflection of the bulk flow generates a force on the body in a direction opposite the deflected flow.

Circulation control in a rotary-wing aircraft is achieved using pressurized air from the aircraft's engine, or an auxiliary fan mounted within the fuselage. The pressurized air is ejected from downwardly-facing slots in the right side of the aircraft's aft fuselage, or tail boom. The resulting jets or sheets of air follow the contour of the tail boom, and deflect the downwash from the main rotor as it travels over the tail boom. This deflection produces a lateral force on the tail boom that partially counters the torque generated by the main rotor.

The systems disclosed in the above-noted patents, in general, do not produce sufficient force to fully counter the biasing torque of the main rotor. Thus, reaction jets are typically used to supplement the anti-torque force generated using circulation-control. More specifically, one or more jets of pressurized air are discharged in a lateral direction through nozzles mounted on the rearward portion of the tail boom. These jets produce a lateral force that counteracts the main rotor torque. The reaction jets also provide the yaw control previously furnished by the tail rotor. In particular, the reaction jets are capable of being throttled in response to pilot input. This feature permits the force produced by the jets (and, therefore, the net lateral force on the aircraft) to be varied, thereby facilitating yaw control.

Anti-torque and yaw-control systems based on circulation control permit a rotary-wing aircraft to be operated without most of the disadvantages associated with tail rotors. The reaction jets used in these systems, however, require a substantial amount of energy to operate. In fact, the energy requirements of reaction jets are roughly equivalent to those of a conventional tail rotor of comparable capabilities. Hence, aircraft that use circulation-control-techniques for anti-torque and yaw control, in general, require power-plants of approximately the same capacity and consume roughly equivalent amounts of fuel as comparable tail-rotor aircraft.

Reducing the overall power requirements of a rotary-wing aircraft can provide substantial benefits. For example, lowering the power requirements of an aircraft facilitates the use of smaller, lighter engines that consume lower amounts of fuel. These reductions can produce corresponding increases in the range and payload capacity of the aircraft. Alternatively, the power formerly dedicated to the tail rotor or jet thrusters can be used to drive a pusher fan located at the rear of the aircraft, thereby allowing the aircraft to achieve a higher maximum forward velocity than would otherwise be possible.

SUMMARY OF THE INVENTION

A preferred embodiment of a rotary-wing aircraft comprises a fuselage, a main rotor rotatably coupled to the fuselage and a tail boom fixedly coupled to the fuselage so that a least a portion of the tail boom is located within an area of downwash from the main rotor. The tail boom defines a plenum chamber therein for holding pressurized fluid.

A preferred embodiment also comprises a linear nozzle mounted on the tail boom and having an opening extending along the tail boom for discharging a sheet of fluid in a direction substantially tangential to an outer surface of the tail boom.

A preferred embodiment also comprises a yaw-control device defining an internal volume therein, wherein the yaw-control device is rotatably coupled to a lower portion of the tail boom and has a first and a second opening formed therein, the internal volume receives the pressurized fluid from the plenum chamber by way of the first opening, and the yaw-control device discharges the pressurized fluid from the internal volume and into the area of downwash from the main rotor by way of the second opening.

Another preferred embodiment of a rotary-wing aircraft comprises a main rotor, a tail boom extending through an area of downwash from the main rotor, and a linear nozzle fixedly coupled to the tail boom and having an opening extending along the tail boom for discharging a sheet of fluid in a direction substantially tangential to an outer surface of the tail boom. A preferred embodiment also comprises a yaw-control device movably coupled to the tail boom and having an opening formed therein for discharging fluid in a direction away from the yaw-control device and into the area of downwash from the main rotor.

A preferred embodiment of an anti-torque and yaw-control system for a rotary-wing aircraft having a main rotor and a tail boom located in an area of downwash from the main rotor comprises a linear nozzle for discharging a first jet of fluid in a direction substantially tangential to an outer surface of the tail boom to produce a layer of fluid flow that extends along the outer surface, and a yaw-control device for being movably coupled to the tail boom. The yaw-control device comprises an outer skin having an opening formed therein for discharging a fluid flow in a direction away from the yaw-control device.

Another preferred embodiment of a rotary-wing aircraft comprises a fuselage, a main rotor rotatably coupled to the fuselage, and a tail boom fixedly coupled to the fuselage so that a least a portion of the tail boom is located within an area of downwash from the main rotor.

A preferred embodiment also comprises a linear nozzle mounted on the tail boom and having an opening extending along the tail boom for discharging a sheet of the pressurized fluid in a direction substantially tangential to an outer surface of the tail boom and toward the yaw-control device.

A preferred embodiment also comprises a yaw-control device comprising an outer skin defining an internal volume within the yaw-control device for receiving the pressurized fluid. The outer skin has an opening formed therein for discharging the pressurized fluid from the internal volume in a direction away from the yaw-control device and into the area of downwash from the main rotor. The yaw-control device is rotatably coupled to the tail boom so that an orientation of the opening can be altered in relation to the tail boom thereby altering a circulation pattern of the rotor downwash around the tail boom.

A preferred method of counteracting main-rotor torque and controlling yaw in a helicopter having a main rotor and a tail boom located within an area of downwash from the main rotor comprises altering a direction of travel of the downwash from the main rotor by directing a first flow of fluid along an outer surface of the tail boom to produce a layer of fluid flow along at least a portion of the outer surface. A preferred method also comprises further altering the direction of travel of the downwash from the main rotor by using a movable yaw-control member to introduce a second flow of fluid into the area of downwash from the main rotor in a direction away from the yaw-control device.

Another preferred embodiment of a rotary-wing aircraft comprises a fuselage, a main rotor rotatably coupled to the fuselage, and a tail boom fixedly coupled to the fuselage so that a least a portion of the tail boom is located within an area of downwash from the main rotor. The tail boom defines a plenum chamber therein for holding pressurized fluid.

A preferred embodiment also comprises a linear nozzle mounted on the tail boom and having an opening extending along the tail boom for discharging a sheet of fluid in a direction substantially tangential to an outer surface of the tail boom, and a yaw-control device having a squared edge. The yaw-control device is coupled to a lower portion of the tail boom so that an opening is formed between the yaw-control device and the tail boom. The pressurized air from the plenum chamber is discharged through the opening. The yaw-control device is rotatable in relation to the tail boom so that a direction in which the pressurized air flows away from the yaw-control device is variable.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

The present invention provides an anti-torque and yaw-control system for a rotary-wing aircraft such as a helicopter. The invention also provides a method for counteracting main-rotor torque and controlling yaw in a rotary-wing aircraft. The invention is disclosed in connection with a particular type of helicopter. This embodiment is described for exemplary purposes only, as the invention can be applied to virtually any type of rotary-wing aircraft that requires anti-torque and yaw control.

FIGS. 1–6 depict a preferred embodiment of a helicopter 12, and various components thereof. The figures are each referenced to a common coordinate system 15 depicted therein.

Figure 1:
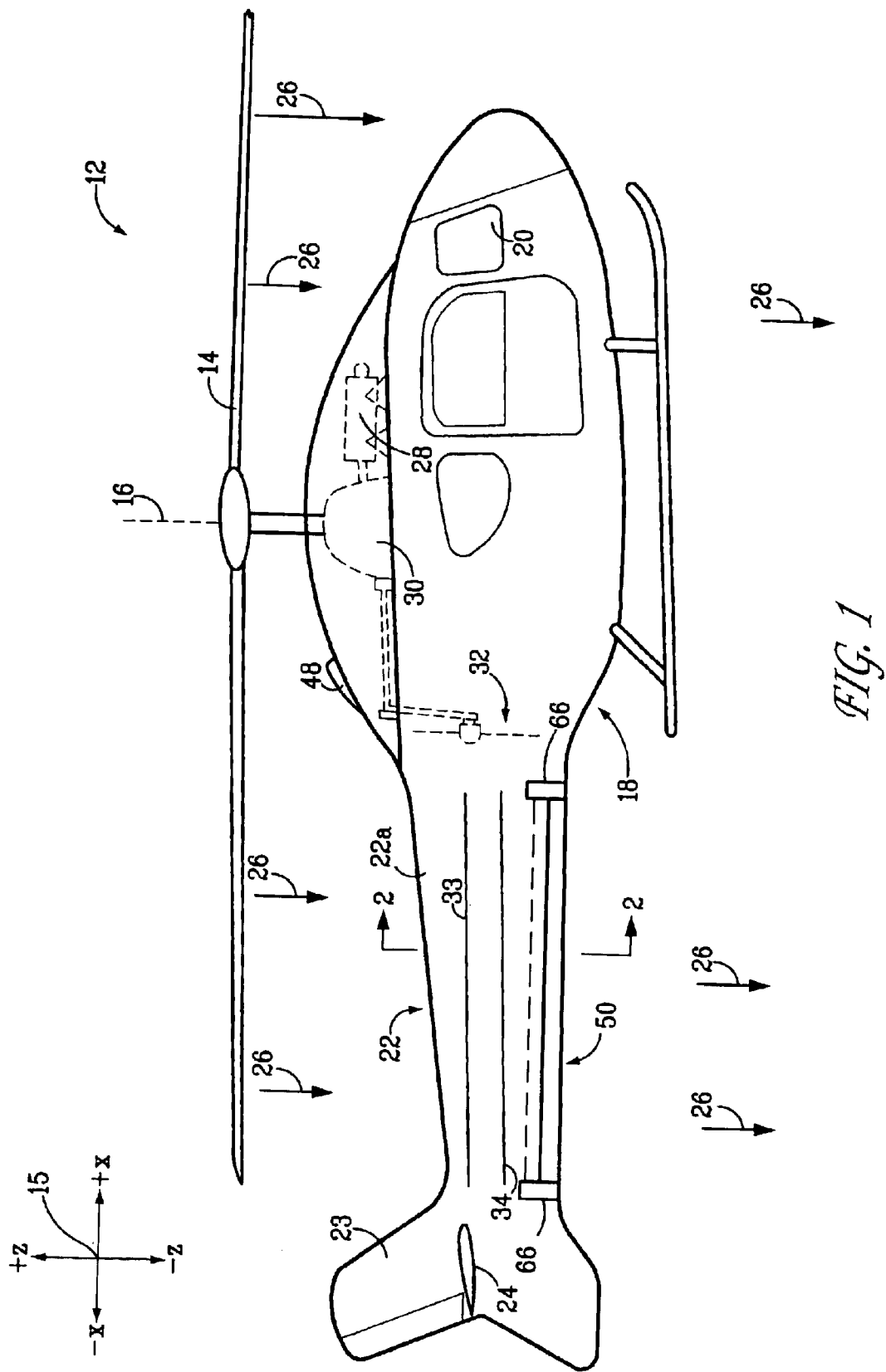
FIG. 1 is a diagrammatic side view of a rotary-wing aircraft comprising a preferred embodiment of an anti-torque and yaw-control system.

The helicopter 12 comprises a main rotor 14 of conventional design (see FIG. 1). The main rotor 14 rotates in a counter-clockwise direction as viewed from above, about an axis 16 passing through its center. A fuselage 18 of conventional design is suspended below the main rotor 14. The fuselage 18 includes a cabin 20 that accommodates a pilot, passengers, and cargo. The fuselage 18 also houses a power plant 28, a transmission 30, and a low-pressure-ratio, variable-pitch fan 32. The power plant 28 drives the main rotor 14 and the fan 32 via the transmission 30. Alternative embodiments of the invention can include a separate power plant for driving the fan 32.

The helicopter 12 further comprises an elongated tail boom 22 fixedly coupled to the fuselage 18 and having an outer surface 22a. The tail boom 22 projects rearward from the fuselage 18. The tail boom 22 extends through an area of downwash, i.e., the wake, produced by the rotation of the main rotor 14 when the helicopter 12 is hovering or moving at relatively low forward velocities. The downwash from the main rotor 14 is represented symbolically by the arrows 26 included in the figures.

The tail boom 22 is substantially hollow. An inner surface 22b of the tail boom 22 defines an elongated plenum chamber 31 within the tail boom 22 (see FIGS. 2–4). The plenum chamber 31 extends rearward from the fan 32 (the fan 32 is not depicted in FIGS. 2–4, for clarity). A vertical stabilizer 23 and a horizontal stabilizer 24 of conventional design are fixedly coupled to the rearward end of the tail boom 22.

A first and a second linear (longitudinal) nozzle or slot 33, 34 are mounted on the right side of the tail boom 22 (from a perspective aft looking forward), as shown in FIGS. 1–3C. The first and second nozzles 33, 34 extend along a substantial entirety of the length of the tail boom 22. This particular configuration is described for exemplary purposes only. The optimum length of the first and second nozzles 33, 34 will vary with factors such as the size and geometry of a given tail boom, and the aerodynamic conditions under which the tail boom is operated.

The first and second nozzles 33, 34 place the plenum chamber 31 in fluid communication with the ambient environment surrounding the tail boom 22. Operational details concerning the first and second nozzles 33, 34, the plenum chamber 31, and the fan 32 are presented below.

The helicopter 12 also comprises a yaw-control device 50. The yaw-control device 50 is movably coupled to a lower portion of the tail boom 22 (see FIGS. 1–4). More particularly, the yaw-control device 50 rotates about its longitudinal axis in relation to the tail boom 22. The yaw-control device 50 preferably has a length approximately equal to that of the first and second nozzles 33, 34. The yaw-control device 50 is preferably tubular, i.e., the yaw-control device 50 preferably is elongated, and has a substantially circular cross section (see FIG. 5).

A first, or upper linear nozzle or slot 58 is formed in the yaw-control device 50. A second, or lower linear nozzle or slot 60 is also formed in the yaw-control device 50. The upper and lower nozzles 58, 60 are preferably positioned at diametrically opposite locations on the yaw-control device 50, as shown FIGS. 2–4. (The upper and lower nozzles 58, 60 can each be positioned at alternative locations along the circumference of the yaw-control device 50 in alternative embodiments.). The upper and lower nozzles 58, 60 each preferably extend over a substantial entirety of the length of the yaw-control device 50.

It should be noted that directional terms such as "upper," "lower," "above," "below," etc. are used in reference to the component orientations depicted in FIG. 1. These terms are used for illustrative purposes only, and are not intended to limit the scope of the appended claims.

The yaw-control device 50 is preferably integrated with the tail boom 22 as shown in FIGS. 1–4. More particularly, an upper portion of the yaw-control device 50 is positioned within the plenum chamber 31 of the tail boom 22, and is thus exposed to the pressurized air within the plenum chamber 31 during operation of the helicopter 12. A lower portion of the yaw-control device 50 is positioned directly below tail boom 22, and is thus exposed to the ambient environment around the helicopter 12.

Figure 4:
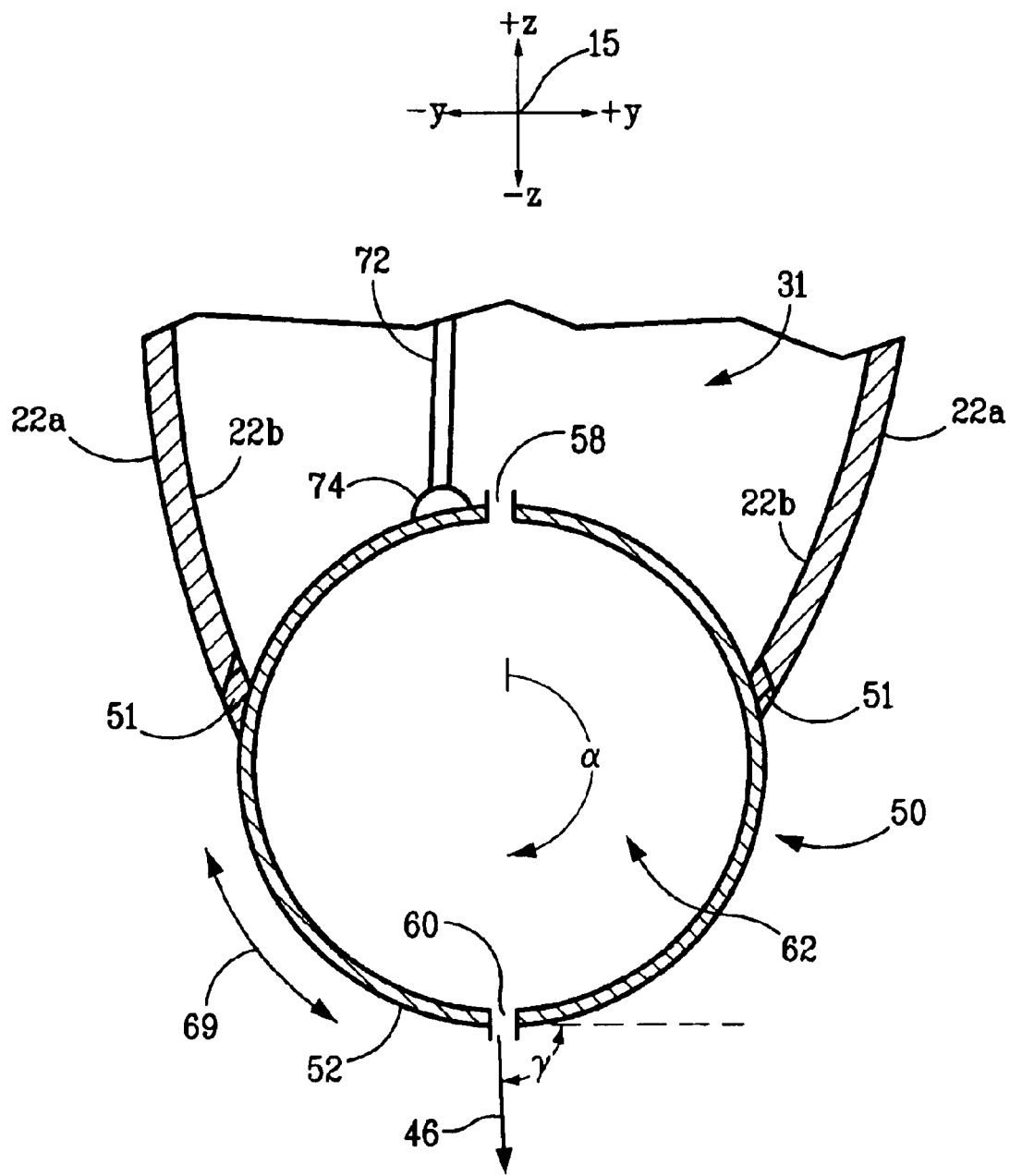
FIG. 4 is a magnified view of the area designated "B" in FIG. 3A.

Seals 51 can be secured to the tail boom 22, between the tail boom 22 and the yaw-control device 50 (see FIG. 4). The seals 51 help to seal the interface between the tail boom 22 and the yaw-control device 50, and thereby inhibit excessive leakage of pressurized air from the plenum chamber 31. (Alternatively, the seals 51 can be secured to the yaw-control device 50.) The seals 51 can be formed from a low-friction material such as TEFLON. It should be noted that alternative embodiments can forgo the use of such seals 51.

Figure 5:
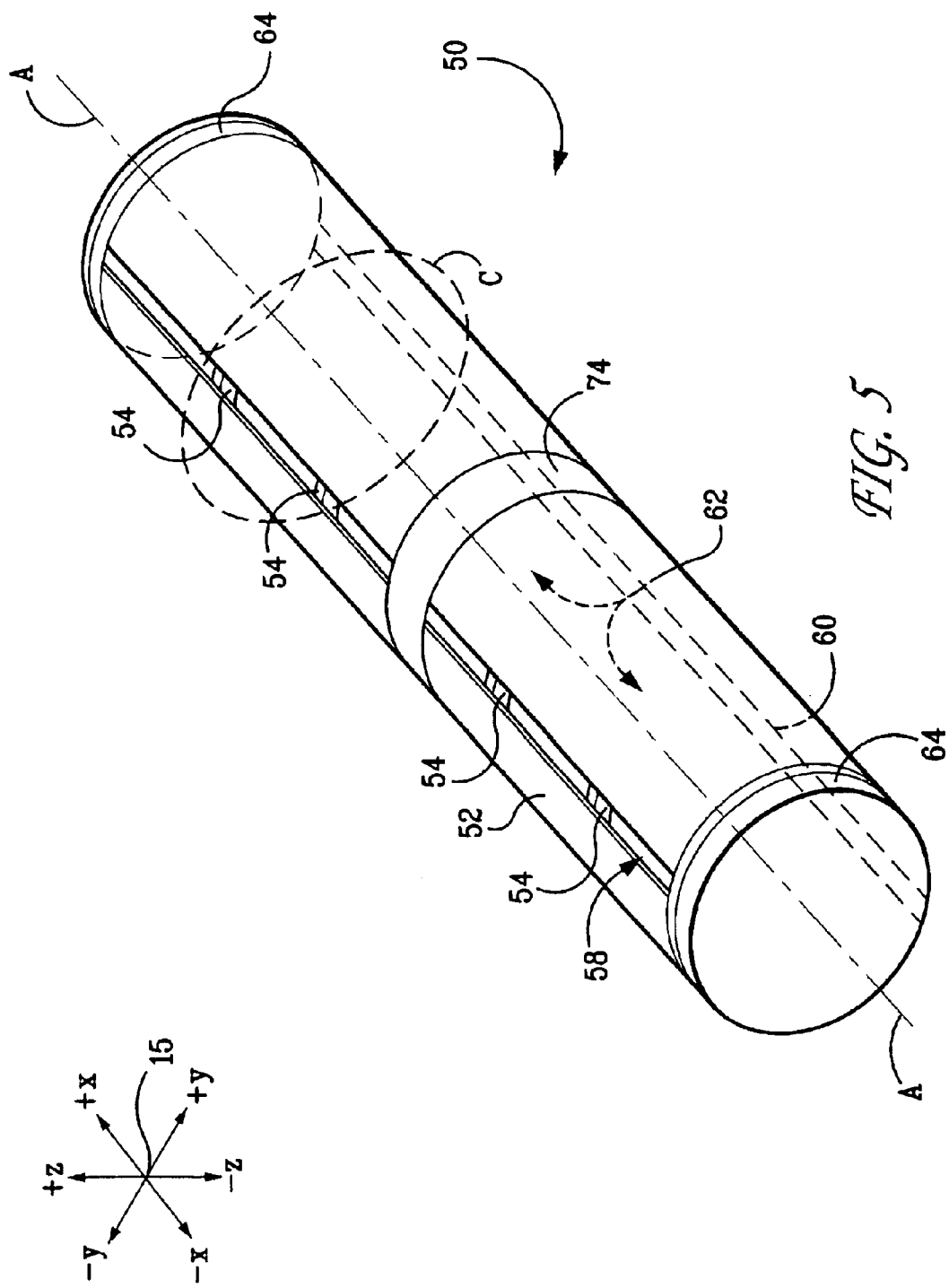
FIG. 5 is a diagrammatic perspective view of the yaw-control device shown in FIGS. 2–4.
Figure 6:
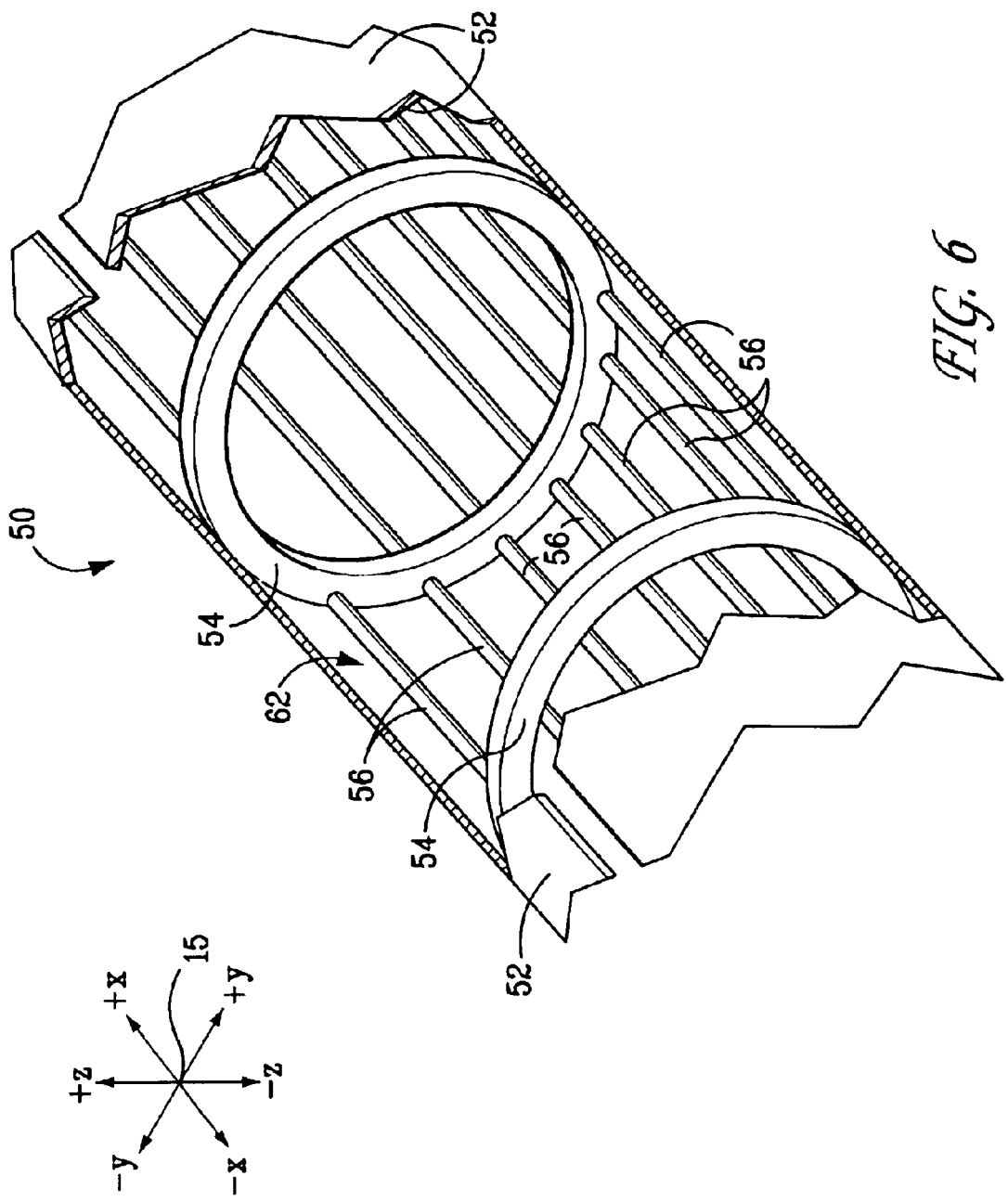
FIG. 6 is a magnified, partial cutaway view of the area designated "C" in FIG. 5.

The yaw-control device 50 can comprise a relatively thin outer skin 52 and a plurality of frame members 54 (see FIGS. 5 and 6). The outer skin 52 can be fastened to the frame members 54 by conventional means such as rivets (not shown). The frame members 54 can be interconnected by a plurality of stringers 56 that each extend continuously over the length of the yaw-control device 50. It should be noted that this particular type of construction for the yaw-control device 50 is disclosed for exemplary purposes only. Other suitable types of construction can be used in the alternative.

The outer skin 52 defines an internal volume 62 within the yaw-control device 50 (see FIGS. 3A–6). The yaw-control device 50 receives pressurized air from the plenum chamber 31. More particularly, pressurized air from the plenum chamber 31 enters the internal volume 62 by way of the upper slot 58. The pressurized air is discharged from the yaw-control device 50 by way of the lower slot 60. The yaw-control device 50 can rotate about its longitudinal axis, thereby altering the direction in which the pressurized air is discharged in relation to the tail boom 22. (The longitudinal axis of the yaw-control device 50 is represented by the line "A" in FIG. 5.) Altering the direction in which the pressurized air is discharged in relation to the tail boom 22, as discussed below, can alter the net aerodynamic force on the tail boom 22.

The yaw-control device 50 can be coupled to the tail boom 22 in any conventional manner that permits the yaw-control device 50 rotate about its longitudinal axis in relation to the tail boom 22. For example, the yaw-control device 50 can be coupled to the tail boom 22 by way of a first and a second flange 64 and a first and a second collar 66 (see FIGS. 1 and 5). More particularly, the first and second flanges 64 can be secured to opposing ends of the yaw-control device 50 as shown in FIG. 5. The first and second collars 66 can be secured to the tail boom 22 proximate the respective ends of the yaw-control device 50, as shown in FIG. 1.

The first and second collars 66 receive the respective first and second flanges 64. The first and second collars 66 can comprise conventional bearings (not shown) for rotatably coupling the first and second collars 66 to the respective first and second flanges 64. Alternatively, a friction-reducing coating such as TEFLON can be applied to the first and second flanges 64 or the first and second collars 66 in lieu of bearings.

It should be noted that the above-described arrangement for coupling the yaw-control device 50 to the tail boom 22 is described for exemplary purposes only. Other types of mounting arrangements can be used in the alternative.

The yaw-control device 50 can rotate in relation to the tail boom 22, as noted above. In particular, the yaw-control device 50 can rotate between a first position as shown in FIG. 3C, and a second position as shown in FIG. 3B. (FIG. 3A depicts the yaw-control device 50 in an intermediate position between the first and second positions.) The direction of movement of the yaw-control device 50 is indicated by the arrow 69 in FIGS. 2–4.

The angle between the vertical ("+z") axis and the centerline of the lower nozzle 60, as measured in the clockwise direction, is denoted by the symbol "$\alpha$" in FIGS. 3A–4. It should be noted that the minimum and maximum values for the angle $\alpha$ will vary by application. Specific minimum and maximum values for the this parameter therefore are not disclosed herein.

Figure 2:
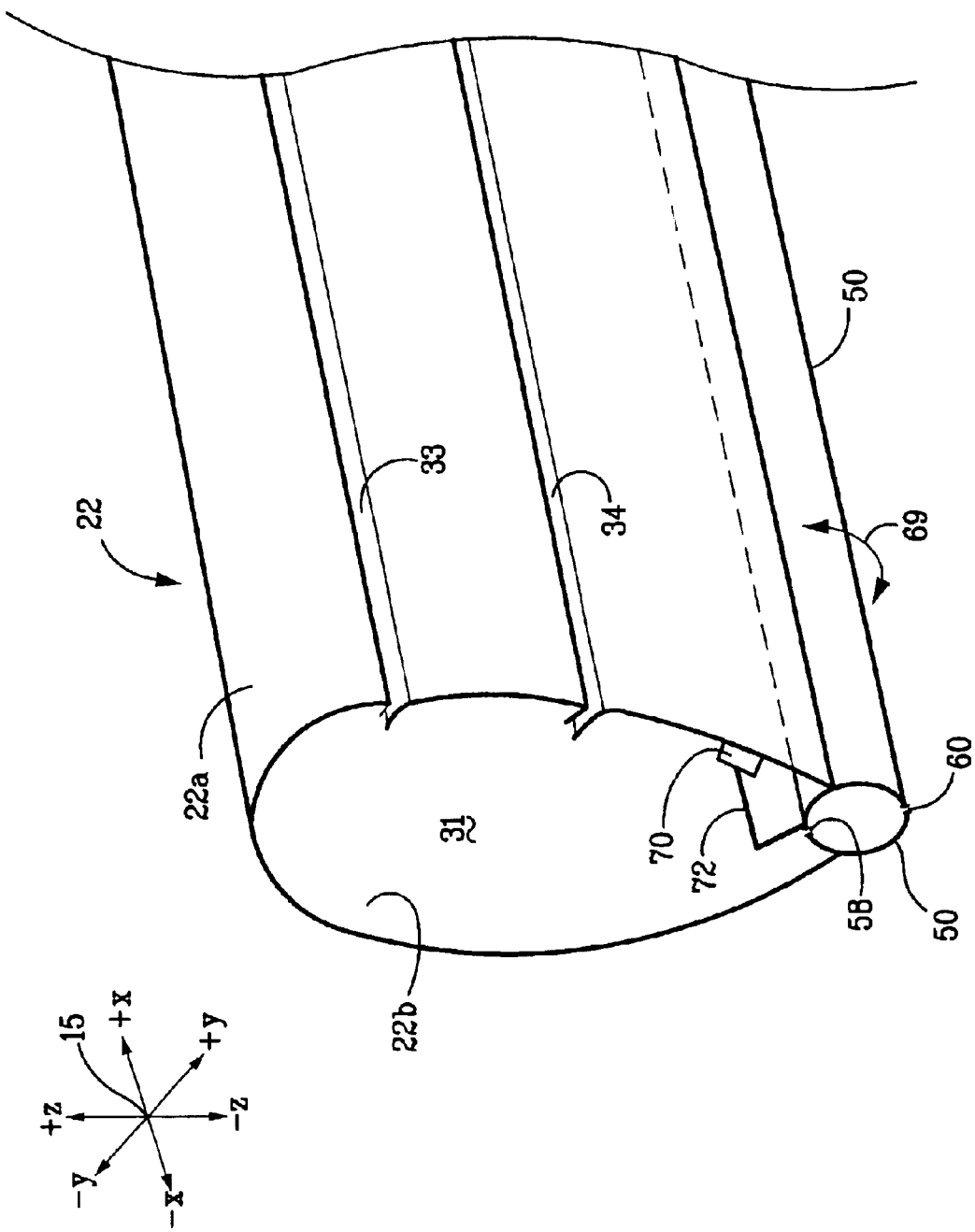
FIG. 2 is a diagrammatic cross-sectional perspective view of a tail boom and a yaw-control device of the rotary-wing aircraft shown in FIG. 1, taken along the line 2—2 of FIG. 1, from a perspective aft looking forward.
Figure 3A:
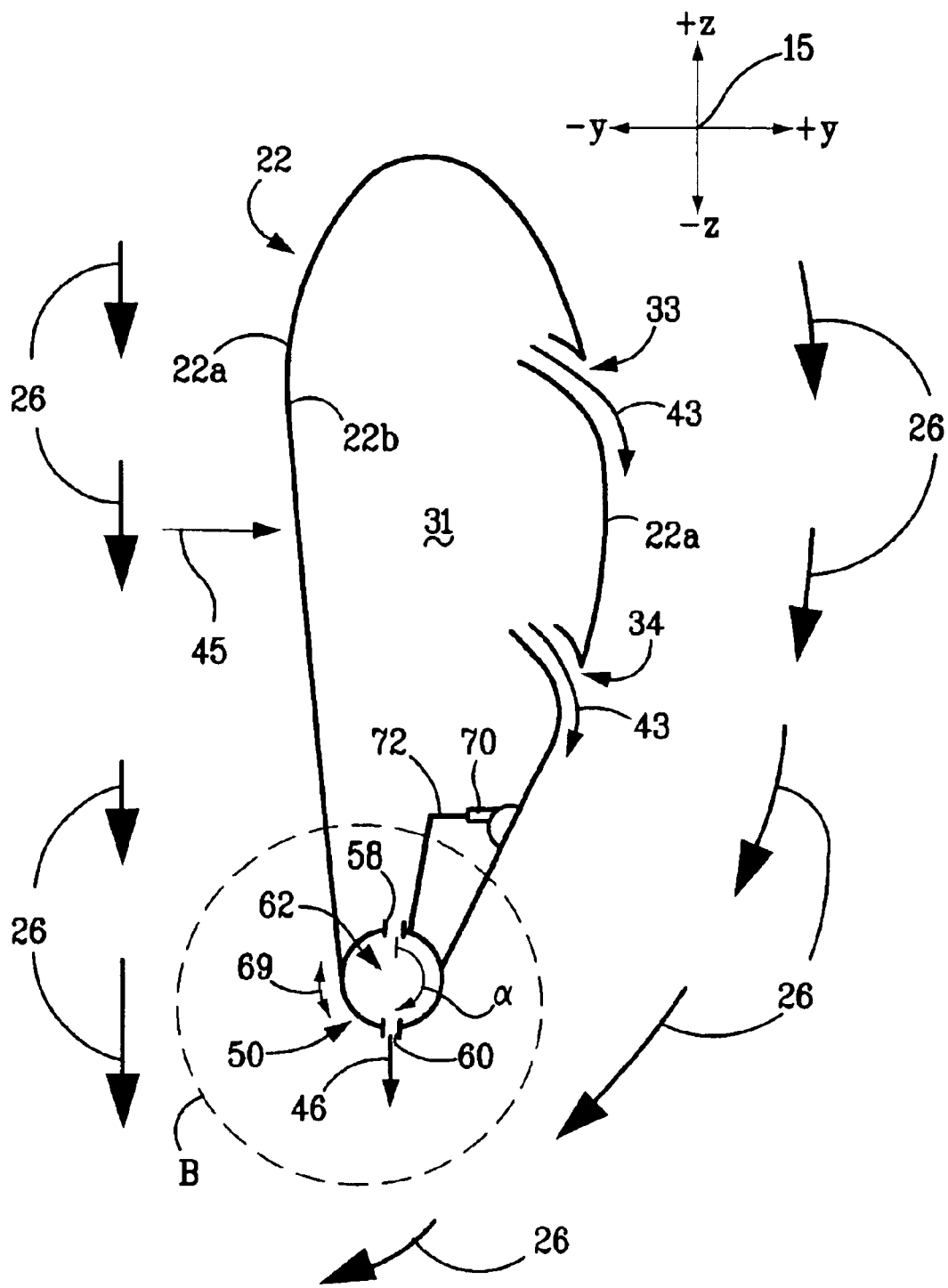
FIG. 3A is a diagrammatic cross-sectional view of the tail boom and the yaw-control device shown in FIG. 2, taken along the line 2—2 of FIG. 1, from a perspective aft looking forward, with the yaw-control device in an intermediate position.
Figure 3B:
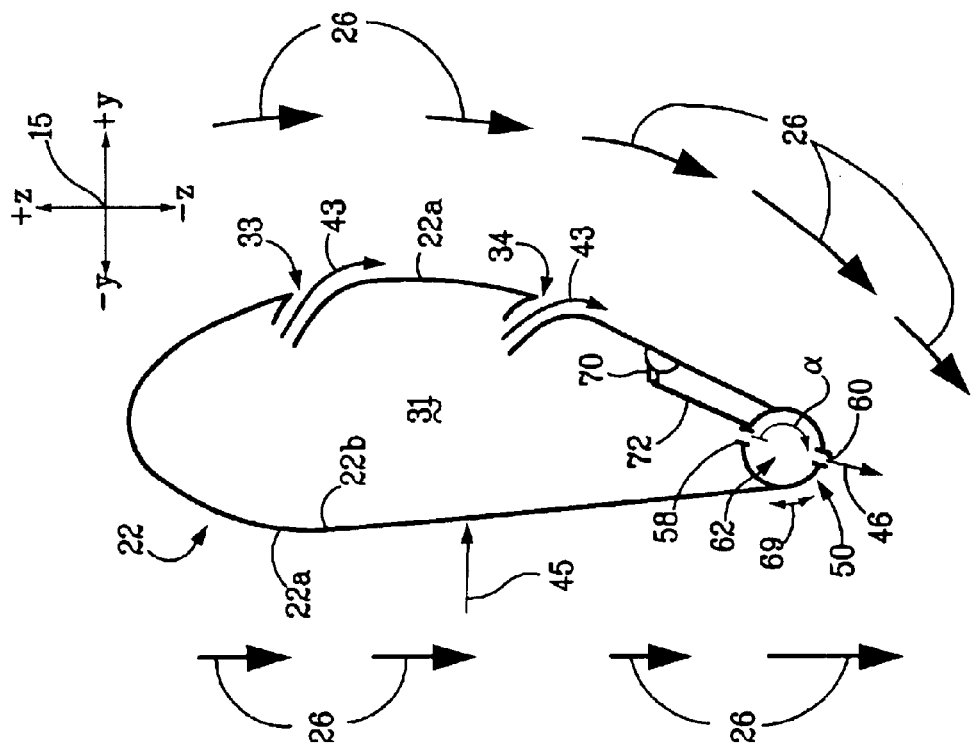
FIG. 3B is a diagrammatic cross-sectional view of the tail boom and the yaw-control device shown in FIGS. 2 and 3A, taken along the line 2—2 of FIG. 1, from a perspective aft looking forward, with the yaw-control device in a second position.
Figure 3C:
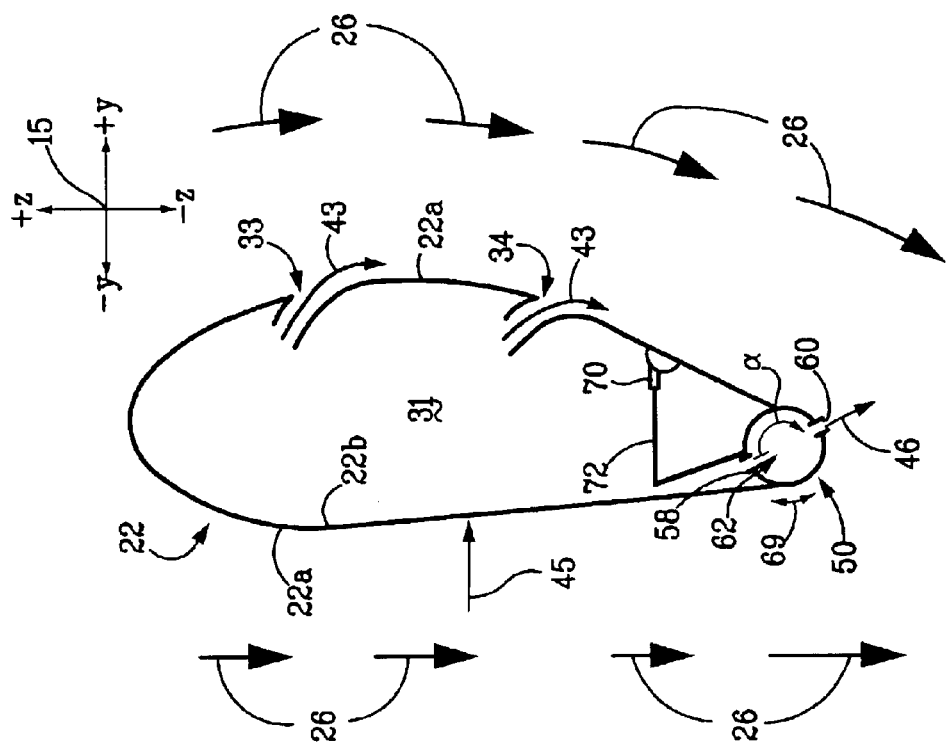
FIG. 3C is a diagrammatic cross-sectional view of the tail boom and the yaw-control device shown in FIGS. 2–3B, taken along the line 2—2 of FIG. 1, from a perspective aft looking forward, with the yaw-control device in a first position.

The helicopter 12 comprises a hydraulic actuator 70 for rotating the yaw-control device 50 (see FIGS. 2–3C). The actuator 70 can be fixedly coupled to the tail boom 22. The actuator 70 can be coupled the yaw-control device 50 by way of a linkage 72, and a sleeve 74 secured to the yaw-control device 50 (see FIGS. 2–5). The actuator 70 is responsive to pilot inputs (either directly, or through an on-board flight-data computer). In other words, the actuator 70 causes the yaw-control device 50 to rotate through the above-noted range of motion based on pilot inputs. It should be noted that the use of the hydraulic actuator 70 is disclosed for exemplary purposes only. Virtually any type of actuator, e.g., electrical, manual (cable and pulley), etc., can be used in the alternative.

Operational details of the helicopter 12 are as follows. The fan 32 draws ambient air through intakes 48 located on an upper portion of the fuselage 18 (see FIG. 1). It should be noted that the intakes 48 are depicted on the upper portion of the fuselage 18 for exemplary purposes only; the intakes 48 can be positioned at virtually any location on the fuselage 18.

The fan 32 pressurizes the ambient air, and circulates the pressurized air into the plenum chamber 31 within the tail boom 22. The pressurized air is subsequently forced (discharged) through the first and second nozzles 33, 34 due to the pressure differential between the plenum chamber 31 and the ambient environment around the tail boom 22. The variable-pitch of the fan 32 permits the pressure ratio across the first and second nozzles 33, 34 be optimized for a given operating condition.

The first and second nozzles 33, 34 are each configured to discharge a linear jet, or sheet, of pressurized air in a direction substantially tangential to an adjacent portion of the outer surface 22a of the tail boom 22. The thin layer of air formed by the nozzles 33, 34 is represented symbolically by the arrow 43 shown in FIGS. 3A–3C (the arrows 43 and 26 are not included in FIGS. 2 or 4, for clarity). The layer 43 flows downward along the outer surface 22a at a velocity greater than that of the main-rotor downwash 26. The layer 43 is believed to remain attached to the outer surface 22a due to a balance between centrifugal force and suction pressure. This phenomenon is referred to by those skilled in the field of aerodynamics as the Coanda Effect.

The relatively fast-moving layer of nozzle-discharge air 43 entrains the rotor downwash 26 on the right side of the tail boom 22 when the helicopter 12 is hovering, or is engaged in vertical flight or low-speed forward flight. This entrainment causes the downwash 26 on the right side to follow the contour of the tail boom 22 more closely than the downwash 26 on the left side, thereby generating a clockwise circulation pattern around the tail boom 22 (from the perspective of FIGS. 3A–4). The noted circulation pattern induces a force having a lateral component (denoted by the arrow 45 in FIGS. 3A–3C) that acts in a direction opposite the biasing toque of the main rotor 14, thereby counteracting the biasing torque. In effect, the tail boom 22 can be conceptualized as a low-aspect-ratio airfoil operating in a flow field generated by the main rotor 14, with the lateral force component 45 representing the lift generated by the airfoil.

The lower nozzle 60 of the yaw-control device 50 discharges a linear jet, or sheet, of pressurized air. More particularly, the pressurized air from the plenum chamber 31 enters the internal volume 62 of the yaw-control device 50 by way of the upper slot 58, as noted above. The pressurized air is subsequently discharged to the ambient environment around the tail boom 22 by way of the lower nozzle 60. The elongated shape of the lower nozzle 60 causes the pressurized air to exit the lower nozzle 60 as a linear jet, or sheet. (The discharge of the lower nozzle 60 is represented symbolically by the arrow 46 in FIGS. 3A–4.)

The discharge 46 of the lower nozzle 60 exits the lower nozzle 60 at an angle of approximately ninety degrees in relation to the local tangent of the outer circumference at the yaw-control device 50. (The angle between the discharge 46 and the local tangent of the outer circumference at the yaw-control device 50 is denoted by the symbol "γ" in FIG. 4.) It should be noted that a particular value for the angle γ is specified for exemplary purposes only. Other values for the angle γ that cause the discharge to be directed away from the yaw-control device 50 can be used in alternative embodiments. In other words, the angle γ should be greater than zero and less than one-hundred eighty degrees so that the discharge 46 is directed away from, and not tangential to, the yaw-control device 50.

It should be noted that the use of the plenum chamber 31 to supply pressurized air to the yaw-control device 50 is a preferred configuration. Pressurized air can be supplied to the yaw-control device 50 by other suitable means in alternative embodiments. For example, pressurized air can be ducted directly to the yaw-control device 50 from the fan 32 in alternative embodiments (the yaw-control device 50 can be located completely outside of the tail boom 22 in this particular alternative embodiment).

The discharge 46 of the lower nozzle 60 is believed to alter the circulation pattern around the tail boom 22, and thus alters the lateral force component 45 on the tail boom 22. For example, the discharge 46 is believed to increase the clockwise circulation around the tail boom 22 (and the resulting lateral force component 45) when the yaw-control device 50 is positioned in its first position, i.e., when the lower nozzle 60 is positioned in its most clockwise position (see FIG. 3C). In particular, the discharge 46 is believed to entrain the downwash 26 from the right side of the tail boom 22. The discharge 46 is believed to increase the clockwise circulation of the entrained downwash 26 due the relative orientations of the discharge 46 and the downwash 26, i.e., due to the more clockwise orientation of the discharge 46 in comparison to the downwash 26.

Conversely, the discharge 46 is believed to decrease the clockwise circulation around the tail boom 22 (and the resulting lateral force component 45) when the yaw-control device 50 is positioned in its second position, i.e., when the lower nozzle 60 is in its most counterclockwise position (se FIG. 3B). In particular, the discharge 46 is believed to decrease the clockwise circulation of the entrained downwash 26 under these circumstances due the counterclockwise orientation of the nozzle discharge 46 in relation to the downwash 26.

The lateral force component 45 on the tail boom 22 can thus be varied by altering the angular position of the yaw-control device 50 in relation to the tail boom 22. In other words, the yaw-control device 50 can be used to alter the circulation pattern developed around the tail boom 22 as a result of the interaction between the rotor downwash 26 and the layer 43 of air discharged from the first and second nozzles 33, 34. The yaw-control device 50 can thereby increase or decrease the lateral force component 45 resulting from the circulation pattern.

The yaw-control device 50 can thus augment the net force available to counteract the biasing torque of the main rotor 14. The substantial benefits provided by this additional anti-torque force are discussed below.

The yaw-control device 50 can also facilitate yaw control of the helicopter 12. In particular, the yaw-control device 50 can be rotated through a predetermined range of motion, as previously noted. The position of the yaw-control device 50 affects the degree to which the direction of the main-rotor downwash 26 is altered which, in turn, affects the lateral force component 45 exerted by the downwash 26. Hence, the selective positioning of the yaw-control device 50 in response to pilot input permits the pilot to control the yaw position and yaw rate of the helicopter 12.

The yaw-control device 50 thus facilitates yaw control of the helicopter 12, while supplementing the anti-torque force available by altering the circulation pattern of the main-rotor downwash 26. In other words, Applicant has developed a system and a method that can potentially furnish all of the required yaw and anti-torque forces through the exclusive use of circulation-control techniques.

The present invention thus provides the substantial benefits available by controlling main-rotor torque without the use of a tail rotor, while avoiding the primary disadvantages associated with most no-tail-rotor helicopters. More specifically, the present invention can eliminate or reduce the need for jet thrusters to control yaw, and to supplement the anti-torque forces generated using circulation-control techniques. Jet thrusters, as explained previously, consume relatively large amounts of energy. Generating anti-torque and yaw forces using circulation-control techniques, by contrast, requires substantially less energy.

Figure 7:
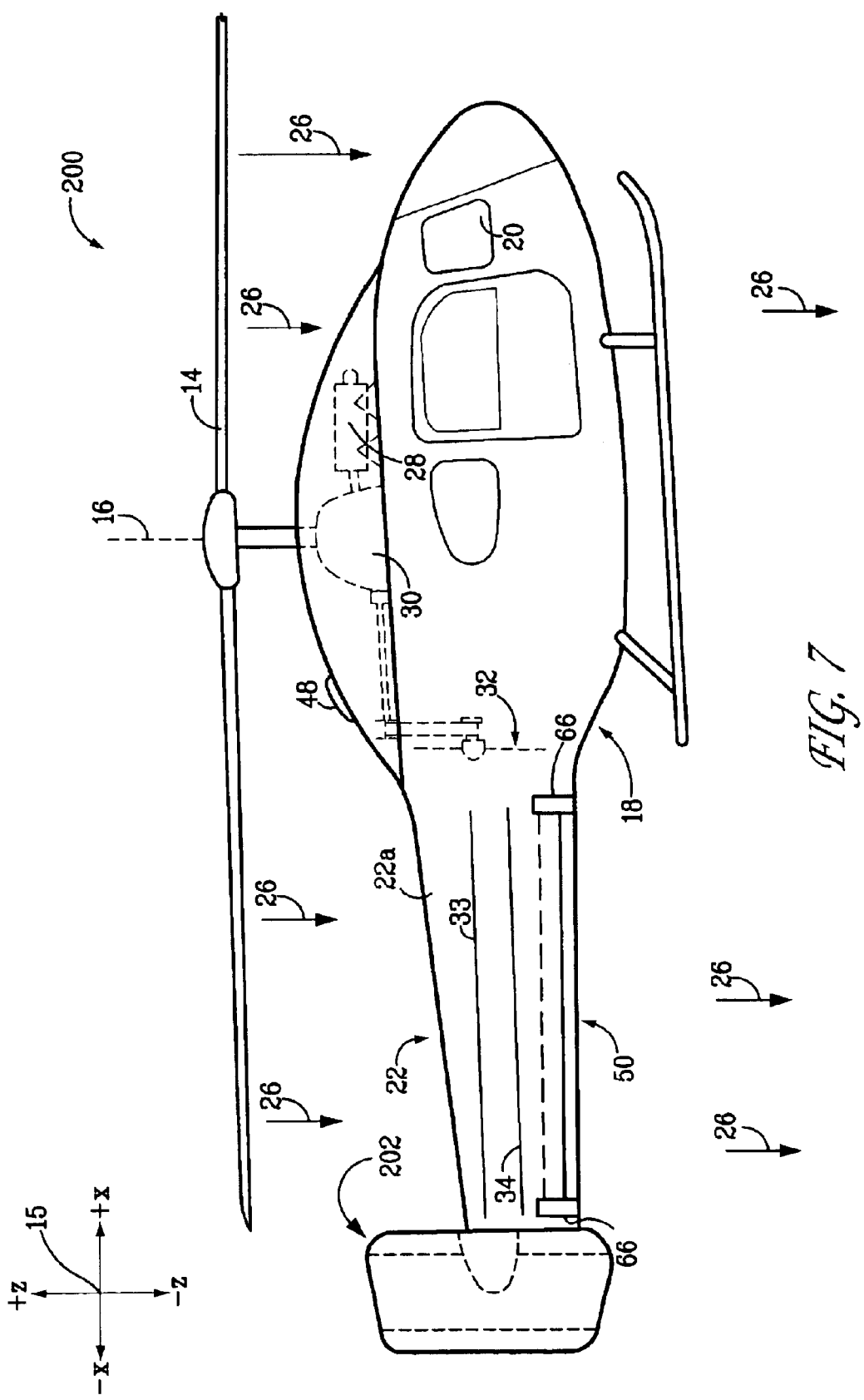
FIG. 7 is a diagrammatic side view of a rotary-wing aircraft comprising the anti-torque and yaw-control system shown in FIGS. 1–6, and a pusher fan.

Thus, a rotary-wing aircraft that relies exclusively on circulation control for anti-torque and yaw control, in general, will require a smaller, lighter power plant and will consume less fuel than a comparable aircraft that uses jet thrusters. These advantages are particularly beneficial in rotary-wing aircraft, as the producers of these types of aircraft are continuously pressured by their customers to increase the range and payload capability of their products. Alternatively, the energy no longer needed to drive a tail rotor or to power jet thrusters can by used to drive a pusher fan, thereby raising the maximum forward velocity of the aircraft without necessarily increasing power-plant size. For example, FIG. 7 depicts a helicopter 200 that incorporates a yaw-control device, such as the yaw-control device 50, in conjunction with a pusher fan 202 (the helicopter 200 is otherwise substantially identical to the helicopter 12; common reference numerals are used in FIGS. 1 and 7 to denote selected features that are common to the helicopters 12 and 200).

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

For example, multiple yaw-control devices can be used in a particular application in lieu of the single elongated device 50 on the helicopter 12. In addition, the pressurized air for the first and second nozzles 33, 34 can be provided by directing exhaust from the power plant 28 into the plenum chamber 31 (in lieu of using ambient air pressurized by a separate fan such as the fan 32). Furthermore, the optimal number of linear nozzles for a given rotary-wing aircraft will vary based on, for example, the size, speed, shape, and aerodynamic characteristics of aircraft. Hence, alternative embodiments of the invention may use a greater or a lesser number of linear nozzles than the two nozzles 33, 34 on the helicopter 12.

Figure 9:
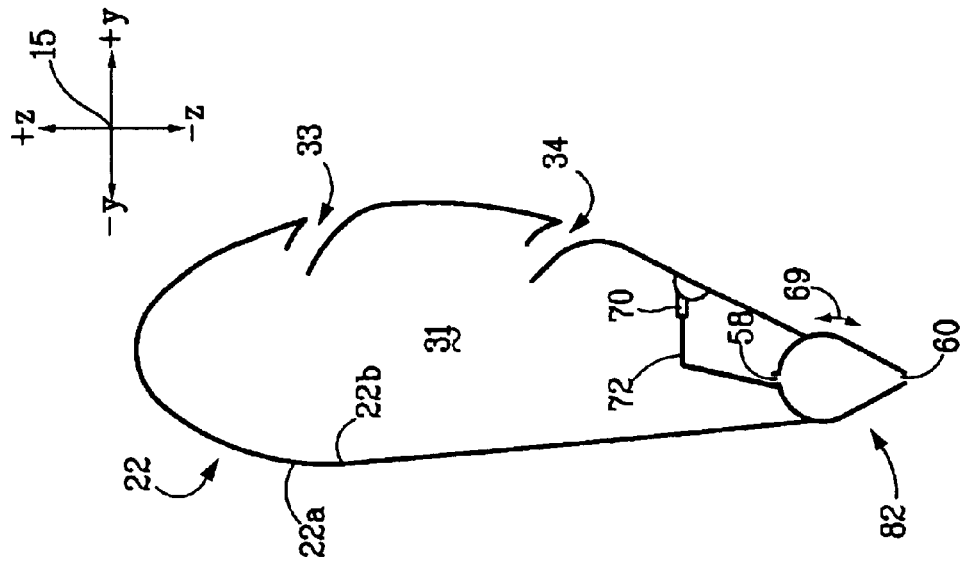
FIG. 9 is diagrammatic cross-sectional view of another alternative embodiment of the yaw-control device shown in FIGS. 2–6.
Figure 8:
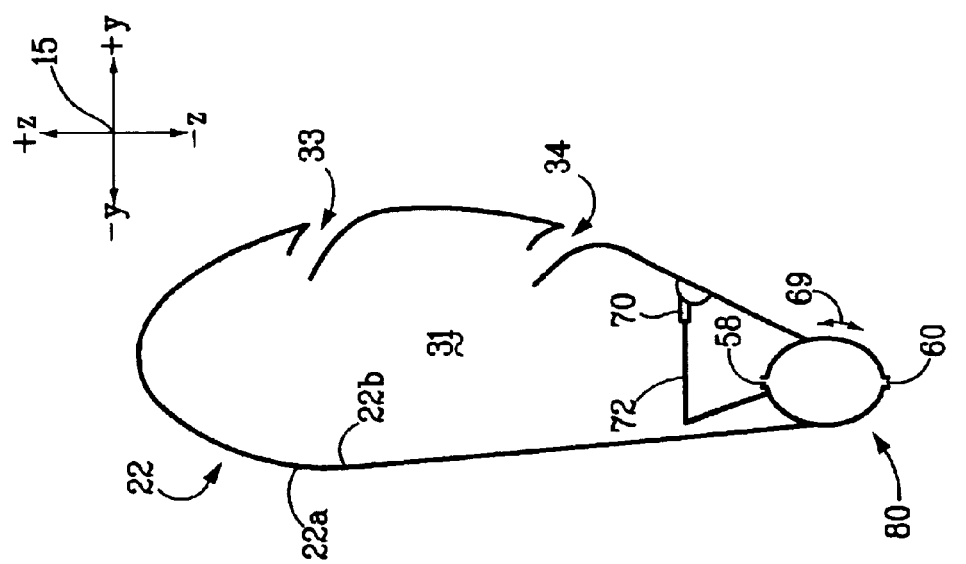
FIG. 8 is a diagrammatic cross-sectional view of an alternative embodiment of the yaw-control device shown in FIGS. 2–6.
Figure 10:
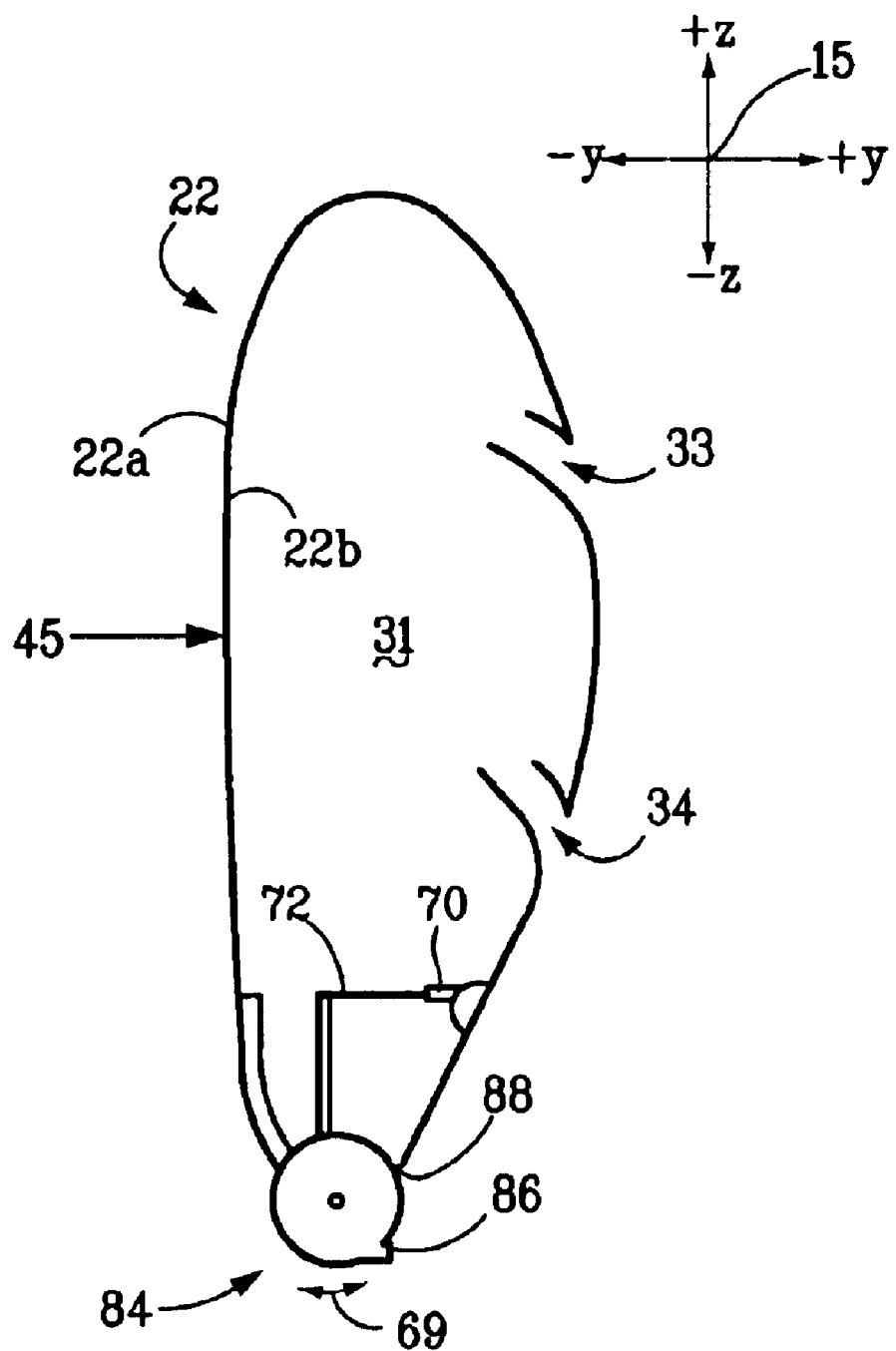
FIG. 10 is diagrammatic cross-sectional view of another alternative embodiment of the yaw-control device shown in FIGS. 2–6.

Moreover, the particular geometric configuration of the yaw-control device 50 described herein is a preferred configuration. Other geometric configurations are possible. For example, FIGS. 8, 9, and 10 depict alternative embodiments of the yaw-control device 50 installed on the tail boom 22. FIG. 8 depicts a yaw-control device 80 having an oval cross-section, and FIG. 9 depicts a yaw-control device 82 having a teardrop-shaped cross-section.

FIG. 10 depicts a yaw-control device 84 having a squared edge 86. A gap 88 is formed between the tail boom 22 and the yaw-control device 84. The gap 88 permits pressurized air from within the plenum chamber 31 to pass out of the plenum chamber 31. The pressurized air is believed to follow the surface of the yaw-control device 50 as it exits and flows away from the gap 88. The pressurized air eventually separates and flows away from the yaw-control device 50. The extent to which the pressurized air follows the surface of the yaw-control device 50 and, thus, the direction in which the pressurized air flows away from the yaw-control device 50, are believed to vary with the angular position of the yaw-control device 84 in relation to the tail boom 22. The lateral force 45 on the tail boom 22 can thus be varied by varying the angular position of the yaw-control device 84 in relation to the tail boom 22.

The slotted-configuration of the upper and lower nozzles 58, 60 described herein is a preferred configuration. Other types of nozzle configurations can be used in the alternative. For example, a convergent nozzle that accelerates the discharge 46 from the yaw-control device can be used in lieu of the lower nozzle 60. Moreover, virtually any type of openings that permit sufficient airflow to pass into or out of the yaw-control device 50, e.g., perforations, through holes, multiple slots, etc., can be used in lieu of the upper and lower nozzles 58, 60.

What is claimed is:

1. A rotary-wing aircraft, comprising:
   a fuselage;
   a main rotor rotatably coupled to the fuselage;
   a tail boom fixedly coupled to the fuselage so that a least a portion of the tail boom is located within an area of downwash from the main rotor, the tail boom defining a plenum chamber therein for holding pressurized fluid;
   a linear nozzle mounted on the tail boom and having an opening extending along the tail boom for discharging a sheet of fluid in a direction substantially tangential to an outer surface of the tail boom; and
   a yaw-control device defining an internal volume therein, wherein the yaw-control device is rotatably coupled to a lower portion of the tail boom and has a first and a second opening formed therein, the internal volume receives the pressurized fluid from the plenum chamber by way of the first opening, and the yaw-control device discharges the pressurized fluid from the internal volume and into the area of downwash from the main rotor by way of the second opening when the rotary-wing aircraft is hovering.

2. The rotary-wing aircraft of claim 1, wherein the first opening is positioned within the plenum chamber.

3. The rotary-wing aircraft of claim 1, wherein the yaw-control device comprises a first and second nozzle mounted in the respective first and second openings.

4. The rotary-wing aircraft of claim 3, wherein the first and second nozzles are linear nozzles.

5. The rotary-wing aircraft of claim 1, wherein the yaw-control device comprises an outer skin and the first and second openings are formed in the outer skin.

6. The rotary-wing aircraft of claim 5, wherein the yaw-control device further comprises a plurality of frame members and a plurality of stringers, the outer skin being fixedly coupled to the frame members and the frame members being interconnected by the stringers.

7. The rotary-wing aircraft of claim 1, further comprising an actuator mechanically coupled to the yaw-control device and the tail boom for rotating the yaw-control device in relation to the tail boom.

8. The rotary-wing aircraft of claim 1, further comprising a first and a second collar fixedly coupled to the tail boom, a first flange fixedly coupled to the yaw-control device and rotatably coupled to the first collar, and a second flange fixedly coupled to the yaw-control device and rotatably coupled to the second collar.

9. The rotary-wing aircraft of claim 1, wherein the yaw-control device is substantially tubular.

10. The rotary-wing aircraft of claim 1, wherein the yaw-control device has a substantially circular cross-section.

11. The rotary-wing aircraft of claim 1, wherein the yaw-control device has a substantially oval cross-section.

12. The rotary-wing aircraft of claim 1, wherein the yaw-control device has a substantially teardrop-shaped cross-section.

13. The rotary-wing aircraft of claim 1, further comprising a seal located between the tail boom and the yaw-control device.

14. The rotary-wing aircraft of claim 1, wherein the pressurized fluid is discharged from the second opening in a direction away from the yaw-control device.

15. The rotary-wing aircraft of claim 1, further comprising a second linear nozzle fixedly coupled to the tail boom and having an opening extending along the tail boom, the second linear nozzle being adapted to discharge a sheet of fluid in a direction substantially tangential to the outer surface of the tail boom.

16. The rotary-wing aircraft of claim 1, wherein the yaw-control device is selectively positionable in relation to the tail boom in response to input from a pilot of the rotary-wing aircraft.

17. The rotary-wing aircraft of claim 1, further comprising a fan in fluid communication with the plenum chamber.

18. The rotary-wing aircraft of claim 17, further comprising an air intake positioned on a top portion of the fuselage and being in fluid communication with the fan.

19. A rotary-wing aircraft, comprising:
a main rotor;
a tail boom extending through an area of downwash from the main rotor;
a linear nozzle fixedly coupled to the tail boom and having an opening extending along the tail boom for discharging a sheet of fluid in a direction substantially tangential to an outer surface of the tail boom; and
a yaw-control device rotatably coupled to the tail boom and having an opening formed therein for discharging fluid in a direction away from the yaw-control device and into the area of downwash from the main rotor when the rotary-wing aircraft is hovering.

20. The rotary-wing aircraft of claim 19, wherein the yaw-control device is rotatably coupled to the tail boom so that an orientation of the opening in relation to the tail boom can be altered thereby altering a circulation pattern of the downwash from the main rotor around the tail boom.

21. The rotary-wing aircraft of claim 19, wherein the yaw-control device comprises a linear nozzle mounted in the opening.

22. The rotary-wing aircraft of claim 19, wherein the yaw-control device has a second opening formed therein and positioned within a plenum chamber formed by the tail boom, and the yaw-control device receives the fluid from the plenum chamber by way of the second opening.

23. The rotary-wing aircraft of claim 19, wherein the yaw-control device comprises an outer skin and the opening is formed in the outer skin.

24. The rotary-wing aircraft of claim 23, wherein the yaw-control device further comprises a plurality of frame members and a plurality of stringers, the outer skin being fixedly coupled to the frame members and the frame members being interconnected by the stringers.

25. The rotary-wing aircraft of claim 19, further comprising an actuator mechanically coupled to the yaw-control device and the tail boom for rotating the yaw-control device in relation to the tail boom.

26. The rotary-wing aircraft of claim 19, further comprising a first and a second collar fixedly coupled to the tail boom, a first flange fixedly coupled to the yaw-control device and rotatably coupled to the first collar, and a second flange fixedly coupled to the yaw-control device and rotatably coupled to the second collar.

27. The rotary-wing aircraft of claim 19, wherein the yaw-control device is substantially tubular.

28. The rotary-wing aircraft of claim 19, wherein the yaw-control device has a substantially circular cross-section.

29. The rotary-wing aircraft of claim 19, wherein the yaw-control device has a substantially oval cross-section.

30. The rotary-wing aircraft of claim 19, wherein the yaw-control device has a substantially teardrop-shaped cross-section.

31. The rotary-wing aircraft of claim 19, wherein the yaw-control device is selectively positionable in relation to the tail boom in response to input from a pilot of the rotary-wing aircraft.

32. A rotary-wing aircraft, comprising:
a fuselage;
a main rotor rotatably coupled to the fuselage;
a tail boom fixedly coupled to the fuselage so that a least a portion of the tail boom is located within an area of downwash from the main rotor;
a linear nozzle mounted on the tail boom and having an opening extending along the tail boom for discharging a sheet of the pressurized fluid in a direction substantially tangential to an outer surface of the tail boom and toward a yaw-control device; and
the yaw-control device, comprising an outer skin defining an internal volume within the yaw-control device for receiving the pressurized fluid, the outer skin having an opening formed therein for discharging the pressurized fluid from the internal volume in a direction away from the yaw-control device and into the area of downwash from the main rotor when the rotary-wing aircraft is hovering, wherein the yaw-control device is rotatably coupled to the tail boom so that an orientation of the opening can be altered in relation to the tail boom thereby altering a circulation pattern of the rotor downwash around the tail boom.

33. A method of counteracting main-rotor torque and controlling yaw in a helicopter having a main rotor and a tail boom located within an area of downwash from the main rotor, comprising:
altering a direction of travel of the downwash from the main rotor by directing a first flow of fluid along an outer surface of the tail boom to produce a layer of fluid flow along at least a portion of the outer surface; and
further altering the direction of travel of the downwash from the main rotor by using a rotatable yaw-control member to introduce a second flow of fluid into the area of downwash from the main rotor in a direction away from the yaw-control device when the rotary-wing aircraft is hovering.

34. A rotary-wing aircraft, comprising:
a fuselage;
a main rotor rotatably coupled to the fuselage;
a tail boom fixedly coupled to the fuselage so that a least a portion of the tail boom is located within an area of downwash from the main rotor, the tail boom defining a plenum chamber therein for holding pressurized fluid;
a linear nozzle mounted on the tail boom and having an opening extending along the tail boom for discharging a sheet of fluid in a direction substantially tangential to an outer surface of the tail boom; and
a yaw-control device having a squared edge, wherein the yaw-control device is coupled to a lower portion of the tail boom so that an opening is formed between the yaw-control device and the tail boom, the pressurized air from the plenum chamber is discharged through the opening, and the yaw-control device is rotatable in relation to the tail boom so that a direction in which the pressurized air flows away from the yaw-control device is variable.

35. A rotary-wing aircraft, comprising:

a fuselage;

a main rotor rotatably coupled to the fuselage;

a tail boom fixedly coupled to the fuselage so that a least a portion of the tail boom is located within an area of downwash from the main rotor, the tail boom defining a plenum chamber therein for holding pressurized fluid;

a linear nozzle mounted on the tail boom and having an opening extending along the tail boom for discharging a sheet of fluid in a direction substantially tangential to an outer surface of the tail boom; and a yaw-control device defining an internal volume therein, wherein the yaw-control device is rotatably coupled to a lower portion of the tail boom and has a first and a second opening formed therein, the first opening is positioned within the plenum chamber, the internal volume receives the pressurized fluid from the plenum chamber by way of the first opening, and the yaw-control device discharges the pressurized fluid from the internal volume and into the area of downwash from the main rotor by way of the second opening.

36. A rotary-wing aircraft, comprising:

a fuselage;

a main rotor rotatably coupled to the fuselage;

a tail boom fixedly coupled to the fuselage so that a least a portion of the tail boom is located within an area of downwash from the main rotor, the tail boom defining a plenum chamber therein for holding pressurized fluid;

a linear nozzle mounted on the tail boom and having an opening extending along the tail boom for discharging a sheet of fluid in a direction substantially tangential to an outer surface of the tail boom; and a yaw-control device defining an internal volume therein, wherein the yaw-control device is rotatably coupled to a lower portion of the tail boom and has a first and a second opening formed therein, the internal volume receives the pressurized fluid from the plenum chamber by way of the first opening, the yaw-control device discharges the pressurized fluid from the internal volume and into the area of downwash from the main rotor by way of the second opening, and the yaw-control device comprises a first and second nozzle mounted in the respective first and second openings.

37. A rotary-wing aircraft, comprising:

a main rotor;

a tail boom extending through an area of downwash from the main rotor;

a linear nozzle fixedly coupled to the tail boom and having an opening extending along the tail boom for discharging a sheet of fluid in a direction substantially tangential to an outer surface of the tail boom; and a yaw-control device movably coupled to the tail boom, wherein the yaw control device has a first opening formed therein for discharging fluid in a direction away from the yaw-control device and into the area of downwash from the main rotor, the yaw control device has a second opening formed therein and positioned within a plenum chamber formed by the tail boom, and the yaw-control device receives the fluid from the plenum chamber by way of the second opening.

* * * * *